(12) United States Patent
Fujiwara et al.

(10) Patent No.: US 7,956,800 B2
(45) Date of Patent: Jun. 7, 2011

(54) POSITION MEASURING METHOD AND MOBILE COMMUNICATION TERMINAL

(75) Inventors: Masanori Fujiwara, Tokyo (JP); Satoshi Miyata, Tokyo (JP); Seiichi Kawakami, Tokyo (JP); Jun Sakamoto, Tokyo (JP); Kazuya Kawakami, Tokyo (JP); Atsushi Wada, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1184 days.

(21) Appl. No.: 11/651,508

(22) Filed: Jan. 10, 2007

(65) Prior Publication Data

US 2010/0253577 A1   Oct. 7, 2010

Related U.S. Application Data

(63) Continuation of application No. PCT/JP2005/012464, filed on Jul. 6, 2005.

(30) Foreign Application Priority Data

Jul. 12, 2004   (JP) .................................. 2004-204088

(51) Int. Cl.
*G01S 19/05* (2010.01)
*G01S 19/25* (2010.01)

(52) U.S. Cl. .............................. 342/357.42; 342/357.64
(58) Field of Classification Search ............ 342/357.42, 342/357.43, 357.63, 357.64, 357.71; 701/207, 701/213; 455/440, 456.1
See application file for complete search history.

(56) References Cited

U.S. PATENT DOCUMENTS

2003/0022674 A1   1/2003   Shintai et al.

FOREIGN PATENT DOCUMENTS

| JP | 10-282205 | 10/1998 |
|---|---|---|
| JP | 2002-196063 | 7/2002 |
| JP | 2002-221563 | 8/2002 |
| JP | 2002-318275 | 10/2002 |
| JP | 2003-37865 | 2/2003 |
| JP | 2004-40170 | 2/2004 |

*Primary Examiner* — Dao L Phan
(74) *Attorney, Agent, or Firm* — Kratz, Quintos & Hanson, LLP

(57) ABSTRACT

A mobile communication terminal 10A, in a process of acquiring assistance information in advance for using for a GPS position measuring at step S10, makes a judgment of whether or not the assistance information is to be acquired, prior to the GPS position measuring command by a user. When a result of this judgment is affirmative, the terminal 10A transmits an assistance information request to a position measuring assistance server 50. When the assistance information is returned from the position measuring assistance server 50 in response to this the assistance information request, in the cellular phone 10A, the assistance information is received and stored, and then prepared for a command for position measuring by the user, for which possibility of being made is higher in a short period. As a result, it is possible to perform quickly the position measuring of a current location of the mobile communication terminal.

11 Claims, 15 Drawing Sheets

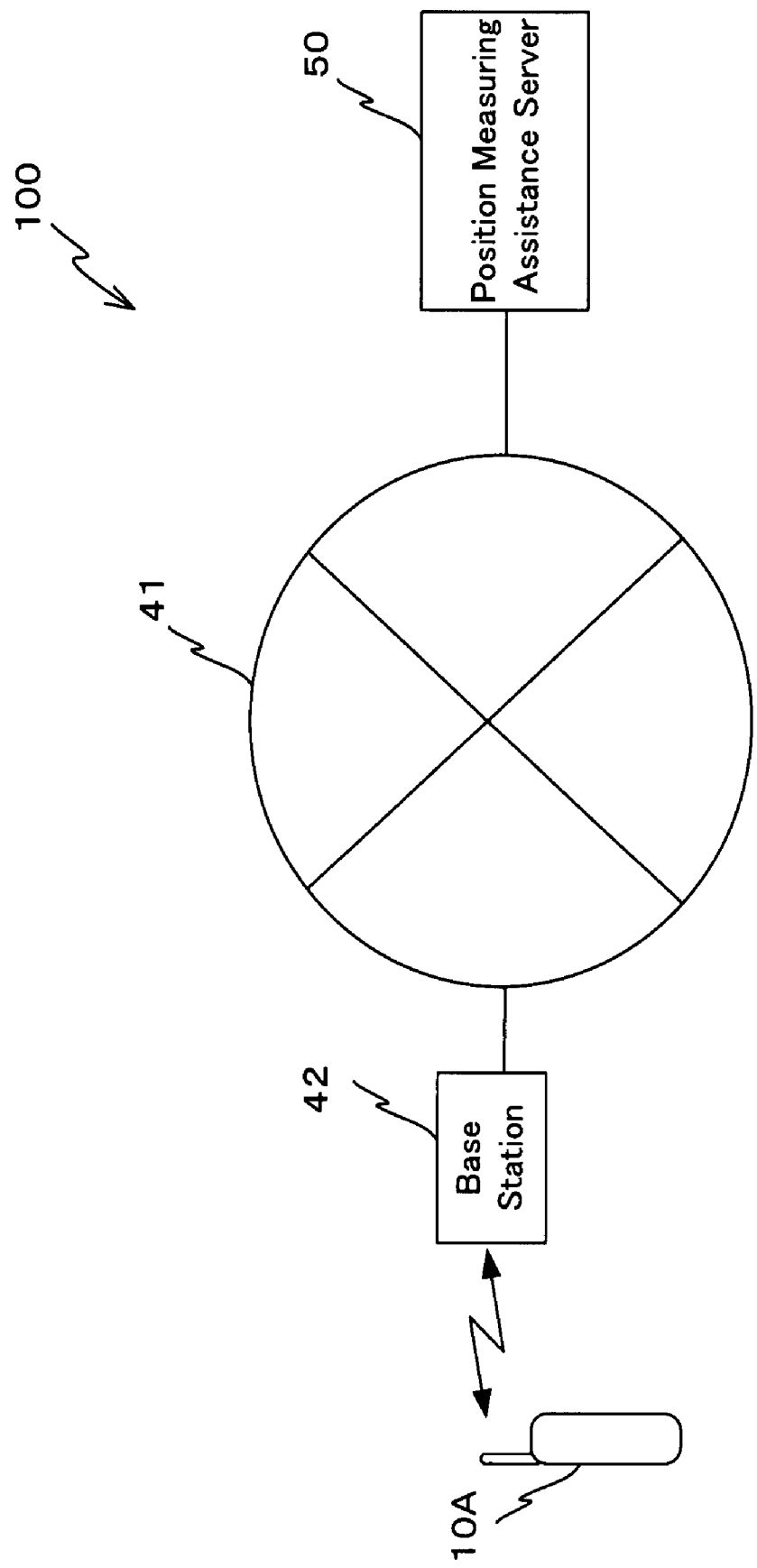

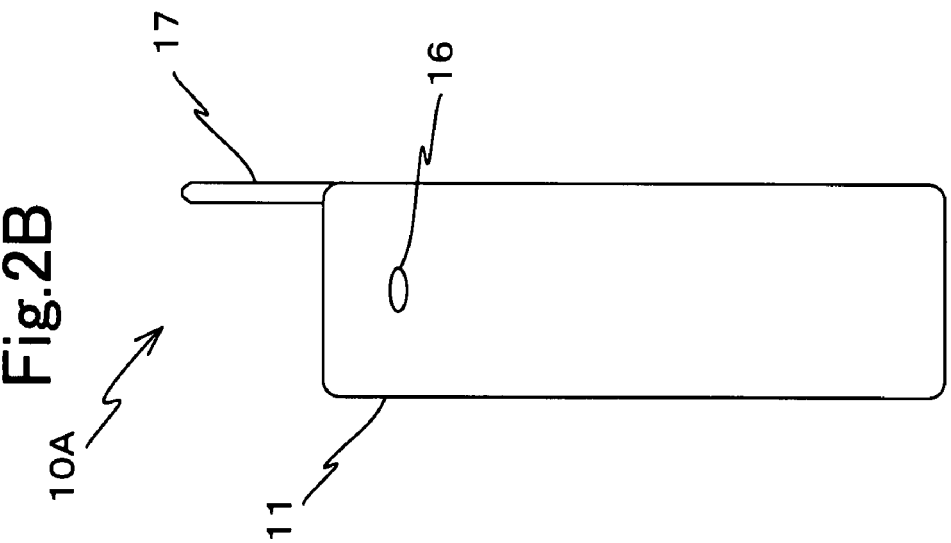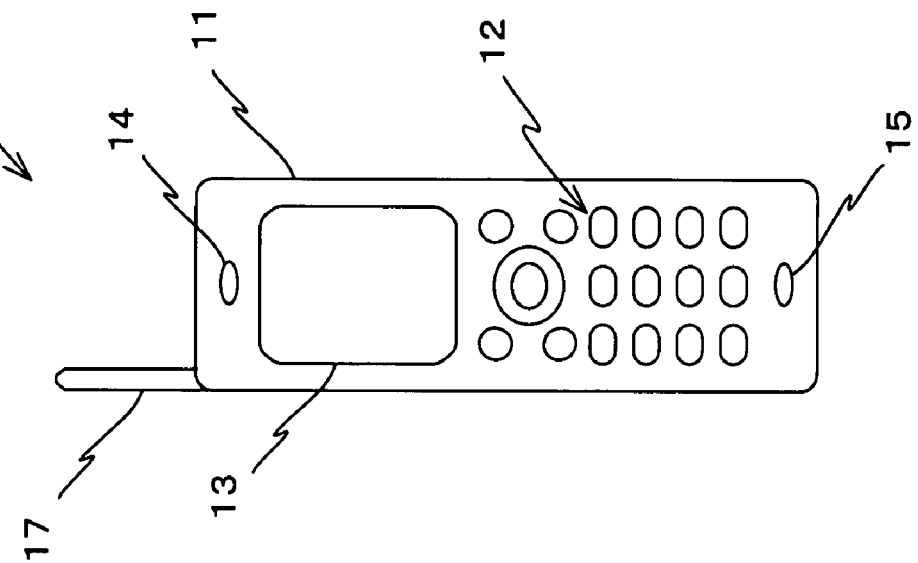

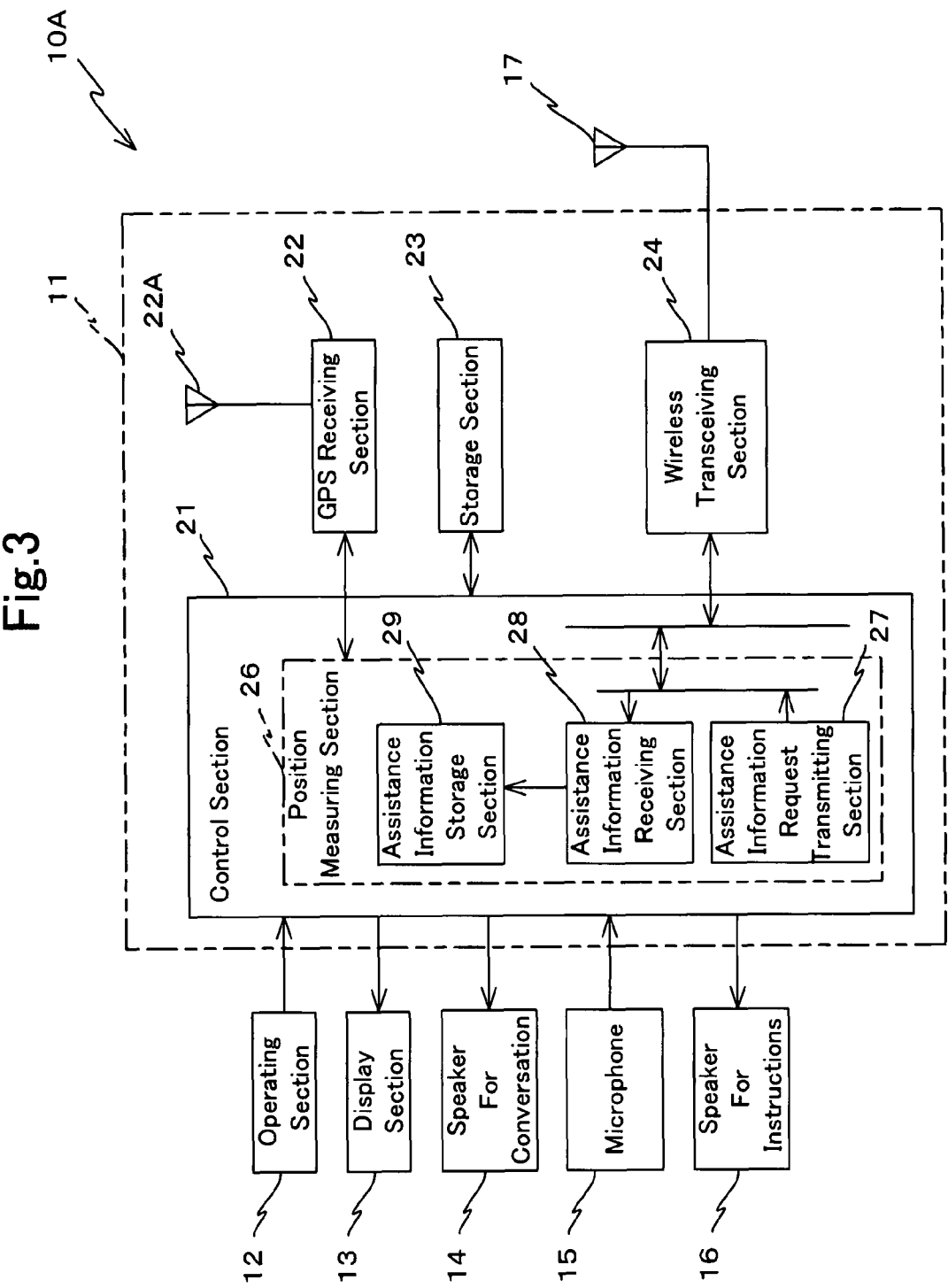

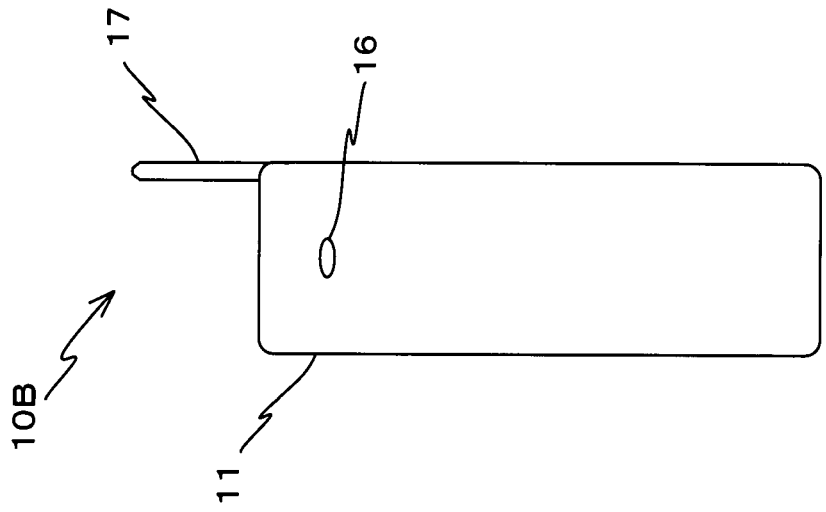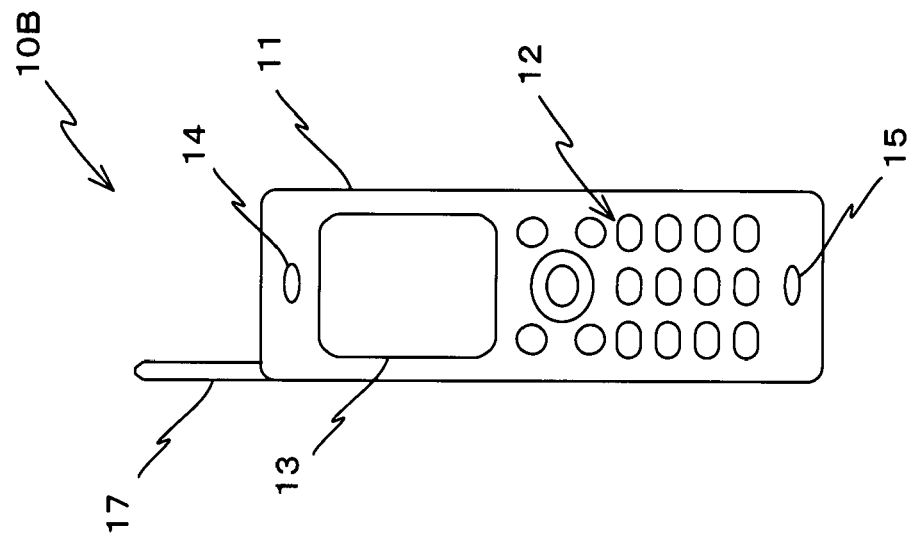

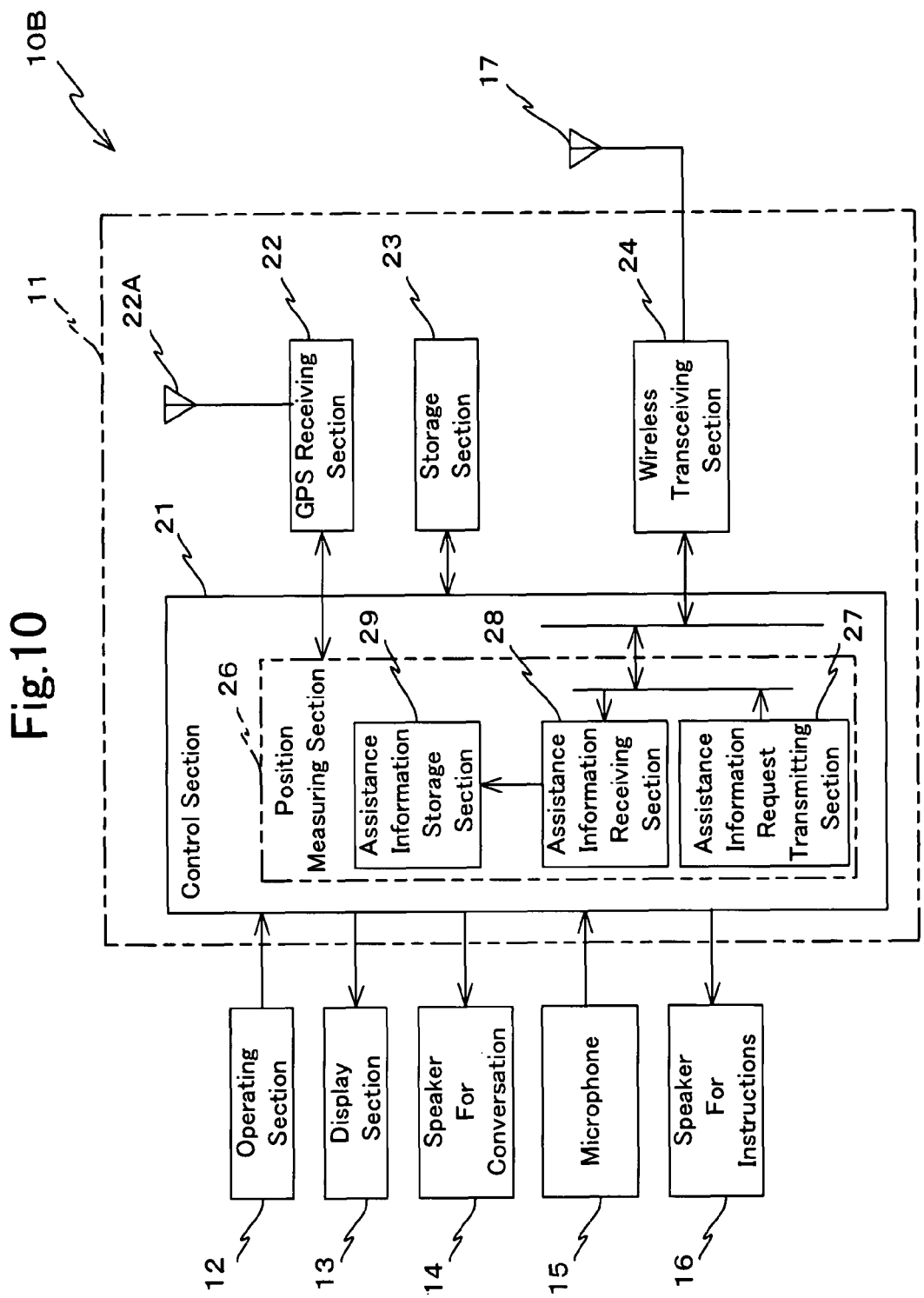

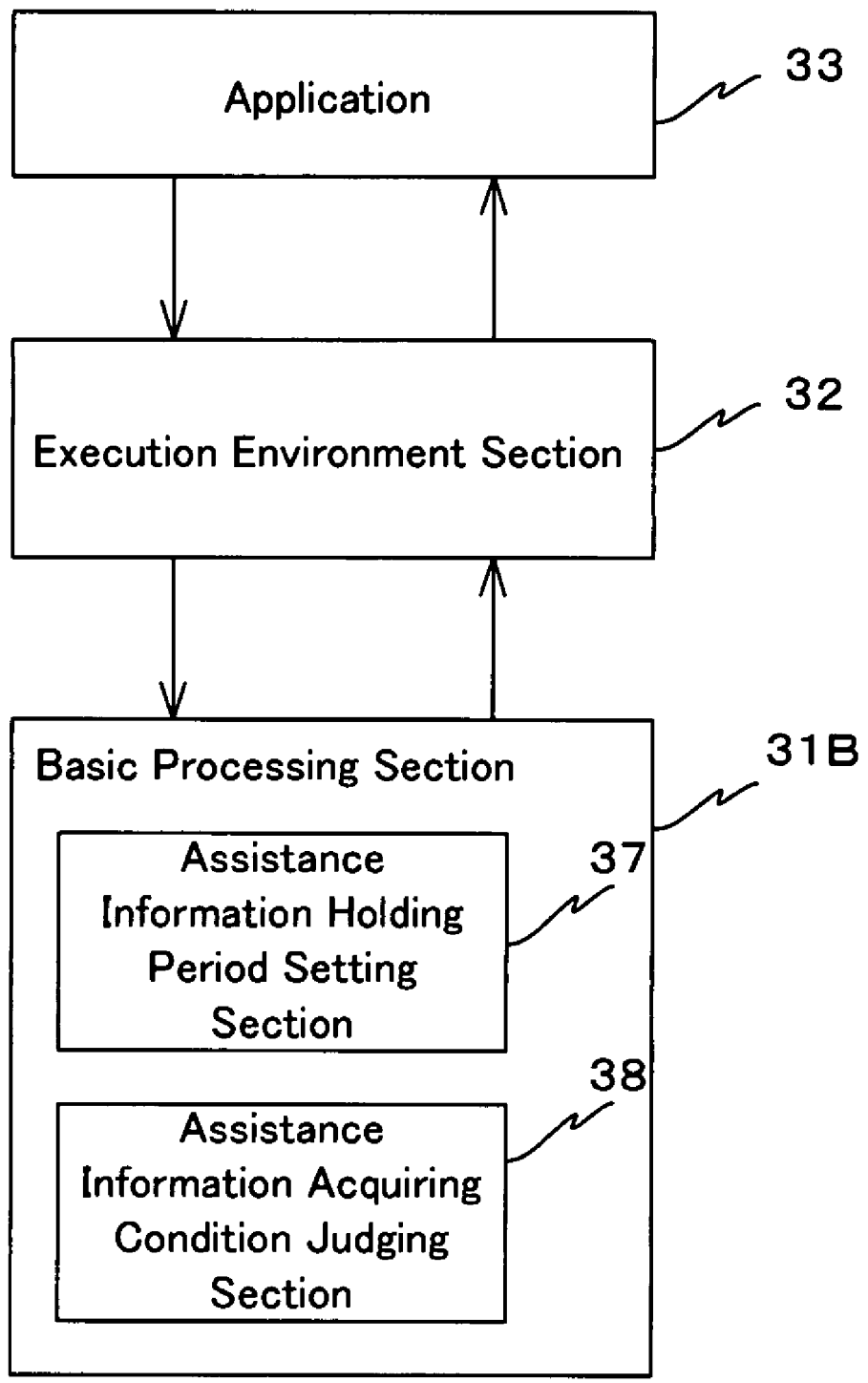

Fig.13
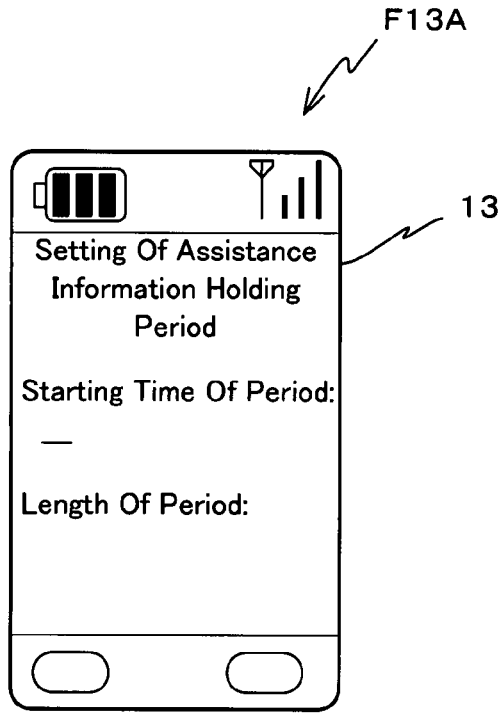
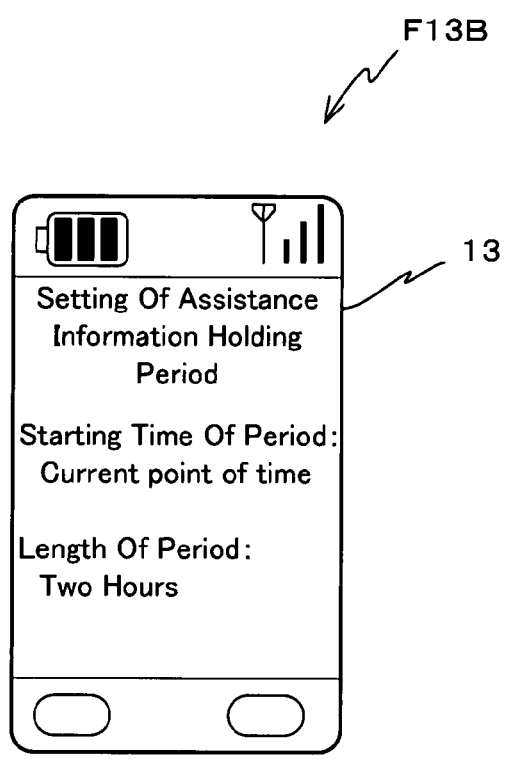

Fig.15
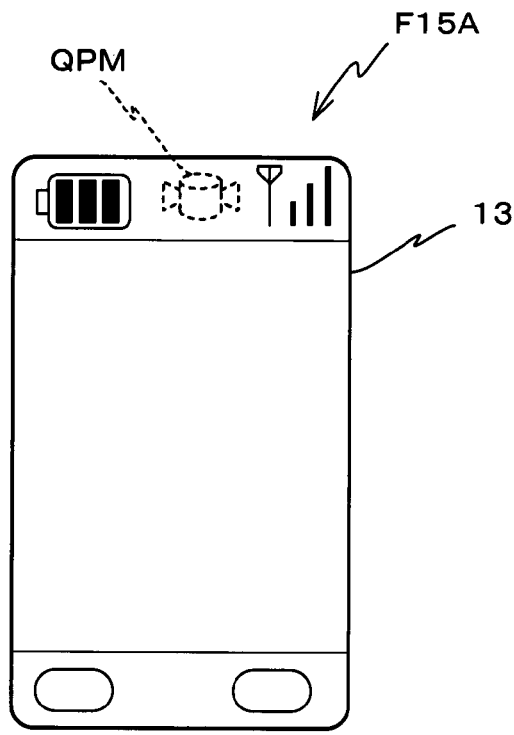
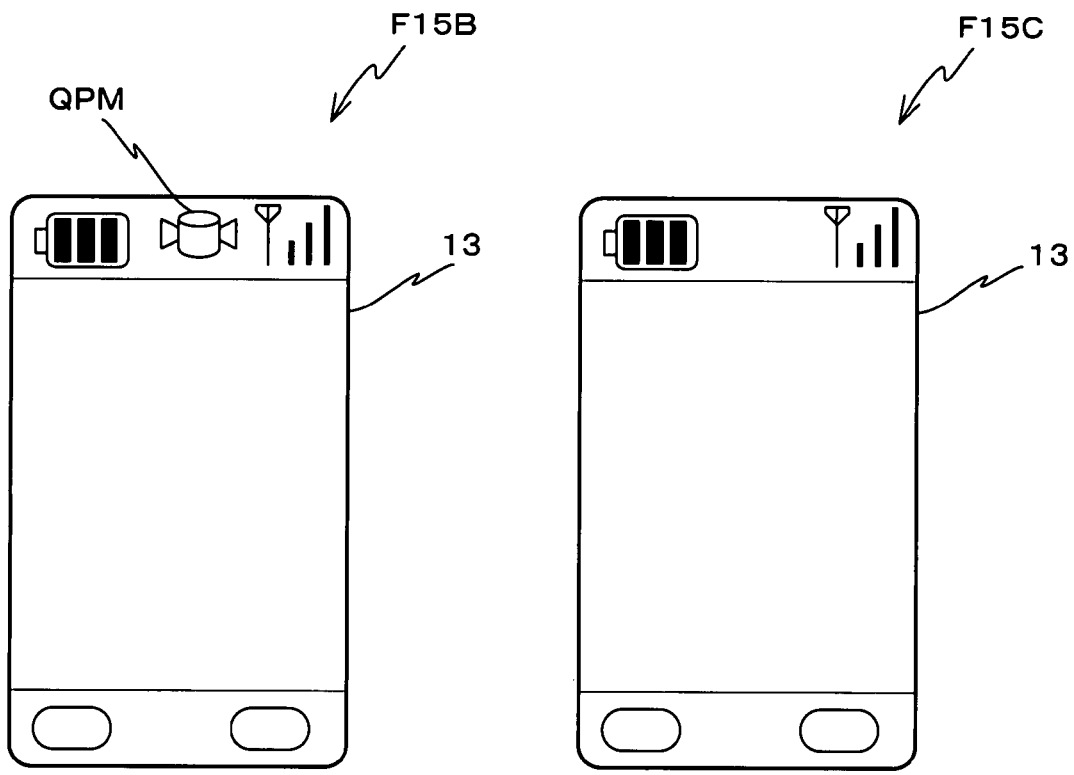

POSITION MEASURING METHOD AND MOBILE COMMUNICATION TERMINAL

RELATED APPLICATIONS

This is a continuation application of the international patent application No. PCT/JP2005/012464 filed with Application date: Jul. 6, 2005. The present application is based on, and claims priority from, J.P. Application 2004-204088, filed on Jul. 12, 2004, the disclosure of which is hereby incorporated by reference herein its entirety.

BACKGROUND OF THE INVENTION

The present invention relates to a method for position measuring and a mobile communication terminal, and particularly to a method for position measuring in which a position measuring of a current location of a mobile communication terminal is performed, and a mobile communication terminal which uses this method for position measuring.

BACKGROUND ART

Mobile communication terminals such as a cellular phone have been hitherto used widely. There has been a remarkable development in functions and performance of the mobile communication terminals. Mobile communication terminals which have a position measuring function which measures a current location of the mobile communication terminal, in addition to essential functions as a mobile communication terminal, such as a call function and a function of sending and receiving an electronic mail (hereinafter, called as only "mail"), have been making debut.

An example of a position measuring in the mobile communication terminals is a position measuring in which a GPS (Global Positioning System) satellite which is capable of a highly accurate position measuring, is used (hereinafter, called as "GPS position measuring"). An example of the GPS position measuring is an autonomous GPS position measuring in which the number of GPS satellites required for the position measuring are captured by it's own by performing successively a search of the entire sky from near the zenith, as it has been used in a car navigation system in automobiles (refer to Patent Literature 1).

On the other hand, an assisted GPS position measuring which enables to capture a GPS satellite even without performing the search of the entire sky, by acquiring assistance information which includes information for capturing a GPS satellite, from a GPS position measuring assistance server connected to a network, has been used practically (refer to Patent Literature 2). In this assisted GPS position measuring, when a user gives a command for the GPS position measuring, first of all, the mobile communication terminal acquires assistance information from the GPS position measuring assistance server via a network. Next, the mobile communication terminal captures a GPS satellite by using information for capturing a GPS satellite, in the assistance information which is acquired, and observes radio waves generated by the GPS satellite which is captured. Further, the mobile communication terminal calculates a current location based on a result of observation. According to the GPS position measuring performed by the assisted GPS position measuring, as compared to the autonomous GPS position measuring, it is possible to shorten significantly a time till capturing the GPS satellite, in a first position measuring in a continuous position measuring, and a single position measuring. Therefore, it is possible to perform the position measuring quickly.

Patent Literature 1: Japanese Patent Application Laid-open Publication No. Hei 10-282205

Patent Literature 2: Japanese Patent Application Laid-open Publication No. 2002-196063

SUMMARY OF THE INVENTION

The conventional assisted GPS position measuring mentioned above is a highly advanced technology from points of view of an accuracy of position measuring and a shortening of position measuring time from the autonomous GPS position measuring. However, although the position measuring time is shortened as compared to the position measuring time in the autonomous GPS position measuring, the position measuring time taken by the conventional assisted GPS position measuring has still been considered to be longer by the user. Therefore, further shortening of the position measuring time by the assisted GPS position measuring is sought.

Incidentally, in the conventional assisted GPS position measuring, in the single position measuring and the first position measuring of the continuous position measuring, an operation of acquiring the assistance information after the command for the GPS position measuring by the user, is performed. However, a proportion of time for this operation of acquiring the assistance information in the overall time for position measuring has been such that it cannot be neglected. Therefore, for shortening the time of acquiring the assistance information in the assisted GPS position measuring, even when the command for GPS position measuring is not made by the user, acquiring the assistance information automatically, and keeping ready for a command for the GPS position measuring by a user, which may be made later, are considered.

However, although roughly accurate information of a current location which is necessary at the time of position measuring, and information of a trajectory of a GPS satellite are included in the assistance information, since the GPS satellite is not a stationary satellite, the trajectory information of the GPS satellite in the assistance information, which has been gathered earlier becomes invalid after elapsing of a certain time, and it becomes necessary to acquire new assistance information. Moreover, when a cell in a range of which the mobile communication terminal exists is changed due to a change in the current location by a movement of the mobile communication terminal, the roughly accurate information of the current location which is necessary at the time of position measuring, in the assistance information which is acquired earlier, becomes invalid, and it becomes necessary to acquire new assistance information. Consequently, even though the assistance information is acquired at a certain point of time, the acquired assistance information cannot be necessarily used when there is a command for the GPS position measuring made voluntarily by the user.

Therefore, in order to be prepared for a command for the GPS position measuring made newly by the user, when a certain time has elapsed or the cell in a range of which the mobile communication terminal exists is changed, acquiring new assistance information all the time, which can be used effectively for the position measuring, is taken into consideration. However, since a communication charge is charged for acquiring the assistance information, when the assistance information which can be used validly is let to be acquired constantly for a GPS position measuring of which the possibility of being performed cannot be said to be high, an economic burden, which the user cannot be said to be aware of explicitly, is laid on the user.

The present invention is made in view of the abovementioned circumstances, and it is an object of the present invention to provide a method for position measuring in which it is possible perform a position measuring with an improved convenience for the user, at the time of position measuring of the current location of the mobile communication terminal.

Moreover, it is an object of the present invention to provide a mobile communication terminal which can improve the convenience for the user, at the time of position measuring of the current location.

A method of position measuring of the present invention is a method of position measuring in which a position measuring of a current location of a mobile communication terminal is performed, comprises steps of: judging acquiring of assistance information at which, the mobile communication terminal, prior to a command for position measuring made by a user, makes a judgment of whether or not the assistance information which is to be used for a GPS position measuring which is performed based on a signal from a GPS satellite is to be acquired; transmitting an assistance information request at which, when a judgment result at the step of judging acquiring of the assistance information is affirmative, the mobile communication terminal transmits the assistance information request which is a request for the assistance information, to an assistance server; and receiving the assistance information at which, the mobile communication terminal receives the assistance information which is returned from the assistance server in response to the assistance information request.

In this method for position measuring, at the step of judging acquiring of the assistance information, the mobile communication terminal, prior to the command for position measuring from the user, makes the judgment of whether or not the assistance information which is to be used for the GPS position measuring which is performed based on the signal from the GPS satellite, is to be acquired. When the judgment result is affirmative, at the step of transmitting the assistance information request, the assistance information request which is a request for the assistance information is transmitted to the assisted server. When the assistance information is returned from the assisted server in response to this assistance information request, in the mobile communication terminal, the assistance information is received at the step of receiving the assistance information. Further, in the mobile communication terminal, the assistance information is held, and prepared for the GPS position measuring by the user.

Consequently, according to the method for position measuring of the present invention, at the time of the position measuring of the current location of the mobile communication terminal, it is possible to perform the position measuring with improved convenience for the user.

In the method for position measuring of the present invention, at the step of judging acquiring of the assistance information, at a start-up time of an application in the mobile communication terminal, an affirmative judgment is made when it is estimated that a possibility of the GPS position measuring being performed during an execution of the application is high. In this case, when the application is started up by a command from the user, concurrently with the start-up operation of the application, at the step of judging acquiring of the assistance information, the affirmative judgment is made when it is estimated that the possibility of the GPS position measuring being performed during the execution of the application is high. Further, when the affirmative judgment is made at the step of judging acquiring of the assistance information, as it has been mentioned above, an operation for acquiring the assistance information is executed. Therefore, it is possible to prepare for the assisted GPS position measuring by the user during the execution of the application having a high possibility of being performed during a short time after the start-up of the application. Consequently, it is possible to perform the position measuring of the current location with an improved convenience for the user, while suppressing rationalistically the communication charges.

In this case, at the step of judging acquiring of the assistance information, it is possible to let to be estimated whether or not the possibility of the GPS position measuring being performed during the execution of the application is high, based on a predetermined parameter value which is included in an application program. In this case, an application programmer can make accurately the estimation of whether or not the possibility of the GPS position measuring performed during the execution of the application is high, by setting information of a possibility that the application performs the position measuring operation, as a value of the predetermined parameter, according to a content of the application.

Moreover, the method for position measuring of the present invention further comprises a step of setting a period at which an assistance information holding period which is a period during which the mobile communication terminal has to hold continuously the assistance information, irrespective of whether or not the command for the position measuring is made by the user, is set, and at the step of judging acquiring of the assistance information, during the assistance information holding period, an affirmative judgment is made when conditions under which the assistance information is to be acquired are satisfied.

In this case, at the step of setting the period, according to the command from the user of the mobile communication terminal, the assistance information holding period which is a period during which the mobile communication terminal has to hold continuously the assistance information, irrespective of whether or not the command for the position measuring is made by the user, is set. After setting the period, at the step of judging acquiring of the assistance information, during the assistance information holding period, a judgment of whether or not the conditions under which the assistance information is to be acquired, are satisfied, is made. In other words, during the assistance information holding period, a judgment of whether or not the mobile communication terminal holds the assistance information which can be used at the time of performing the GPS position measuring at a current point of time is made. When a result of this judgment is negative, the judgment at the step of judging acquiring of the assistance information is repeated.

When the judgment result at the step of judging acquiring of the assistance information is affirmative, as it has been mentioned above, the operation for acquiring the assistance information is executed. As a result, during the assistance information holding period which is set in spite of unavoidable communication charges, for accurate and quick position measuring, for the possibility of the position measuring being performed by the user is high, it is possible to let to be constantly a state in which the assistance information which can be possibly used for the assisted GPS position measuring, is held. In a period other than the assistance information holding period, during which the possibility of the user performing the position measuring is low, only when there is a command for the GPS position measuring, the assistance information is acquired for which the communication charge is charged. Consequently, it is possible to perform the position measuring of the current location with an improved convenience for the user, while suppressing rationalistically the communication charges.

In this case, it is possible to make an arrangement such that the assistance information holding period is set in various ways. For example, it is possible to let the assistance information holding period to be a period from a point of time at which the assistance information holding period is set at the step of setting the period, till a specified time is elapsed. Moreover, it is possible to let the assistance information holding period to be a period from a starting time which is set at the step of setting the period, till an ending time.

Moreover, it is possible to let a condition that number of cells in range of which the mobile communication terminal existed has become more than one, after acquiring the assistance information to be included in conditions under which the assistance information is to be acquired newly. In this case, as a result of a movement of the mobile communication terminal, new assistance information is acquired when it becomes necessary to update assistance information which is acquired before.

Furthermore, it is possible to let the conditions under which the assistance information is to be acquired newly include that a validity of the assistance information acquired has expired. In this case, with the elapsing of time, when the validity of the assistance information which is acquired has expired and the assistance information becomes invalid, new assistance information is acquired.

A mobile communication terminal of the present invention which performs a position measuring of a current location comprises: a means for judging acquiring of assistance information which, during a short period from a current point of time, makes a judgment of whether or not the assistance information which is to be used for a GPS position measuring, where there is a high possibility of performing the GPS position measuring which is performed based on a signal from a GPS satellite, is to be acquired; an assistance information request transmitting means which transmits an assistance information request which is a request for the assistance information which, when a judgment result at the step of judging acquiring of the assistance information is affirmative, transmits the assistance information request to an assistance server; an assistance information receiving means which receives the assistance information which is returned from the assistance server in response to the assistance information request; and an assistance information storage means which stores the assistance information which is received by the assistance information receiving means.

In this mobile communication terminal, the means for judging acquiring of the assistance information, in the short period from the current point of time, makes a judgment of whether or not the assistance information which is to be used for the GPS position measuring, where there is a high possibility of performing the GPS position measuring which is performed based on the signal from the GPS satellite, is to be acquired. When this judgment result is affirmative, the assistance information request transmitting means transmits the assistance information request, which is a request for the assistance information, to the assistance server. When the assistance information is returned from the assistance server in response to this assistance information request, the assistance information receiving means receives the assistance information. Further, in the mobile communication terminal, the assistance information is stored in the assistance information storage means, and is prepared for the command for the GPS position measuring from the user, for which the possibility of being performed in the short period thereafter is high.

In other words, in the mobile communication terminal of the present invention, it is possible to perform the position measuring of the current location by using the method for position measuring of the present invention which is described above. Consequently, according to the mobile communication terminal of the present invention, it is possible to perform the position measuring of the current location with the improved convenience for the user.

In the mobile communication terminal of the present invention, a configuration can be let to be such that the means for judging acquiring of the assistance information, at a start-up time of an application, makes an affirmative judgment when it is estimated that a possibility of the GPS position measuring being performed during an execution of the application is high.

In this case, when the application is started up by a command from the user, concurrently with the start-up operation of the application, the means for judging acquiring of the assistance information makes the affirmative judgment when it is estimated that the possibility of the GPS position measuring being performed during the execution of the application is high. Further, when the affirmative judgment is made by the means for judging acquiring of the assistance information, the assistance information request transmitting means transmits to the assistance server, the assistance information request which is a request for the assistance information to be used for the GPS position measuring. When the assistance information is returned from the assistance server in response to this assistance information request, the assistance information receiving means receives the assistance information. Further, the assistance information is stored in the assistance information storage means. Therefore, it is possible to prepare for the command for the assisted GPS position measuring by the user during the execution of application, for which the possibility of being performed during the short time after the start up of the application is high. Consequently, it is possible to perform the position measuring of the current location with the improved convenience for the user, while suppressing rationalistically the communication charges.

Moreover, the mobile communication terminal of the present invention, further comprises: a period setting means which sets an assistance information holding period which is a period during which the mobile communication terminal has to hold continuously the assistance information, irrespective of whether or not the command for the position measuring is made by the user; and it is possible to make a formation such that the means for judging acquiring of the assistance information, during the assistance information holding period, makes an affirmative judgment when conditions under which the assistance information is to be acquired newly, are satisfied.

In this case, the period setting means, according to the command from the user, sets the assistance information holding period which is a period during which the mobile communication terminal has to hold continuously the assistance information, irrespective of the command for the position measuring from the user. Hereafter, the means for judging acquiring of the assistance information, during the assistance information holding period, makes a judgment of whether or not the conditions, under which the assistance information is to be acquired newly, are satisfied. Further, when this judgment result is affirmative, the assistance information request transmitting means transmits to the assistance server, the assistance information request which is a request for the assistance information to be used for the GPS position measuring. When the assistance information is returned form the assistance server in response to the assistance information request, the assistance information receiving means receives the assistance information. Further, the assistance information is stored in the assistance information storage means.

Therefore, during the assistance information holding period, it is possible that the mobile communication terminal is prepared for the command for the GPS position measuring from the user, for which the possibility of being performed during the short period from the current point of time, is high. Consequently, it is possible to perform the position measuring of the current location with the improved convenience for the user, while suppressing rationalistically the communication charges.

As it has been mentioned above, according to the method for position measuring of the present invention, an effect is shown that it is possible to perform the position measuring with the improved convenience for the user, at the time of position measuring of the current location of the mobile communication terminal.

Moreover, according to the mobile communication terminal of the present invention, an effect is shown that it is possible to perform the position measuring of the current location with the improved convenience for the user.

BRIEF DESCRIPTION OF THE DRAWINGS

FIG. 1 is a diagram showing schematically a configuration of a position measuring system which includes a cellular phone according to a first embodiment of the present invention;

FIG. 2A is a diagram showing schematically a front side external view of the cellular phone in FIG. 1;

FIG. 2B is a diagram showing schematically a rear side external view of the cellular phone in FIG. 2;

FIG. 3 is a functional block diagram of the cellular phone in FIG. 1;

FIG. 9A is a diagram showing schematically a front side external view of a cellular phone according to a second embodiment;

FIG. 9B is a diagram showing schematically a rear side external view of the cellular phone according to the second embodiment;

FIG. 10 is a functional block diagram of the cellular phone in FIG. 9A and FIG. 9B;

FIG. 11 is a diagram for describing a configuration of a computer program which is executed by a control section in FIG. 10;

FIG. 13 is a diagram for describing an example of a screen display in a process of setting an assistance information holding period in FIG. 12;

FIG. 15 is a diagram for describing an example of a screen display during the assistance information holding period.

DETAILED DESCRIPTION

First Embodiment

Figure 4:
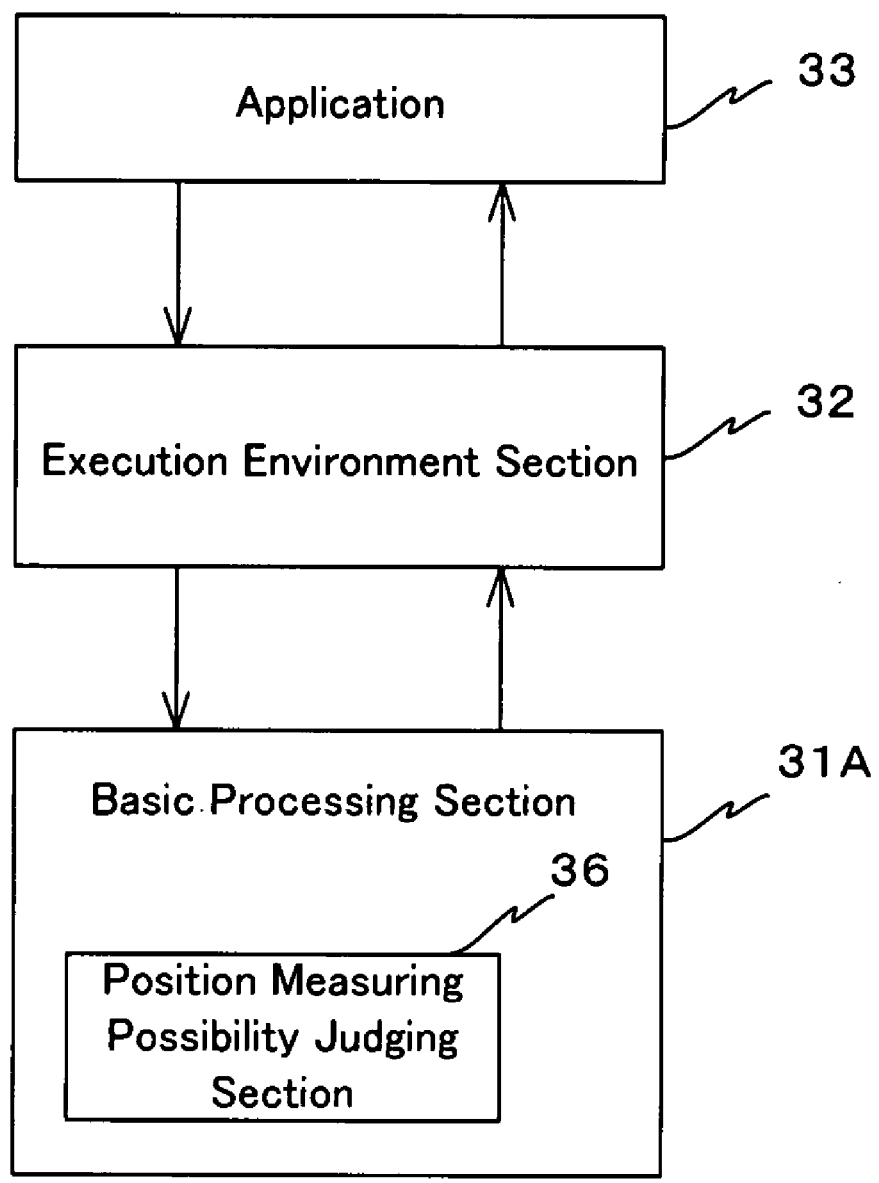
FIG. 4 is a diagram for describing a configuration of a computer program which is executed in a control section in FIG. 3.

A first embodiment of the present invention will be described below while referring to FIG. 1 to FIG. 8. In these diagrams, same reference numerals are assigned to the similar or same components, and the repeated description is omitted.

A configuration of a position measuring system 100 which is includes a cellular phone 10A which is a mobile communication terminal according to the first embodiment of the present invention is shown schematically in FIG. 1. As shown in FIG. 1, this position measuring system 100 includes (a) the cellular phone 10A, (b) a network 41 to which the cellular phone 10A is connected via a base station 42 which performs a wireless communication with the cellular phone 10A, and (c) a position measuring assistance server 50 which is connected to the network 41. In this case, normally there is a plurality of cellular phones and base stations, but in FIG. 1 one cellular phone 10A and one base station 42 are shown as representatives (representative examples).

In FIG. 2A and FIG. 2B, an external structure of the cellular phone 10A is shown schematically. As shown in FIG. 2A and FIG. 2B, the cellular phone 10A includes (a) a cellular phone main body 11 which includes a control section 21 (refer to FIG. 3) which will be described later, (b) an operating section 12 which includes a numerical keypad for inputting telephone numbers, and function keys for inputting various commands such as switching of an operation mode, to the control section 21, and (c) a display section 13 having a liquid crystal display device which displays operation instructions, operation status, and messages received etc. according to a command from the control section 21. Moreover, the cellular phone 10A includes (d) a speaker for conversation 14 which reproduces an aural signal transmitted from a communication counterpart during conversation, (e) a microphone 15 for inputting sound during listening, and inputting voice during conversation, and (f) a speaker for instructions 16 for generating a ring tone and an instruction sound, according to the command from the control section 21. Furthermore, the cellular phone 10A includes (g) an antenna 17 for transferring a wireless signal to and from the base station 42.

In this case, as it is shown in FIG. 3, an inside of the cellular phone main body 11 is provided with (i) the control section 21 which performs an integrated control of an operation of the entire cellular phone main body 11, and (ii) a GPS receiving section 22 which includes a GPS antenna 22A for receiving radio waves from a GPS satellite, under a control by the control section 21, and which receives the radio waves from the GPS satellite. Moreover, the inside of the cellular phone main body 11 is provided with (iii) a storage section 23 which is formed by a read only memory (ROM) and a random access memory (RAM) and so forth, and (iv) a wireless transceiving section 24 for performing a communication with the base station 42.

The control section 21 includes a central processing unit (CPU) and a digital signal processor (DSP) and so forth, and performs various data-processing as well as an operation control of other components mentioned above, to realize general cellular phone functions. A software configuration of a computer program etc. which is executed in the control section 21 is as shown in FIG. 4.

In other words, a software in the control section 21 includes (i) a basic processing section 31A which realizes a conversation function, a mail function, and a character inputting function which are basic functions as a cellular phone, as well as performs a control of various hardware resources mentioned above, (ii) an application 33 for providing to a user various contents such as games etc., and (iii) an execution environment section 32 which is positioned between the basic processing section 31A and the application 33, and provides an execution environment for the application 33. In this case, the execution environment section 32 is a set of computer programs for providing software resources for execution of applications such as a command conversion between the application 33 and the basic processing section 31A, and a management of the application 33.

The basic processing section 31A includes a position measuring possibility judging section 36. The position measuring possibility judging section 36, at a time of start-up of the application 33, during the execution of the application 33, makes a judgment of whether or not a possibility of making a request for a GSP position measuring based on a signal from the GSP satellite, according to a command from the user, is high.

Figure 5:
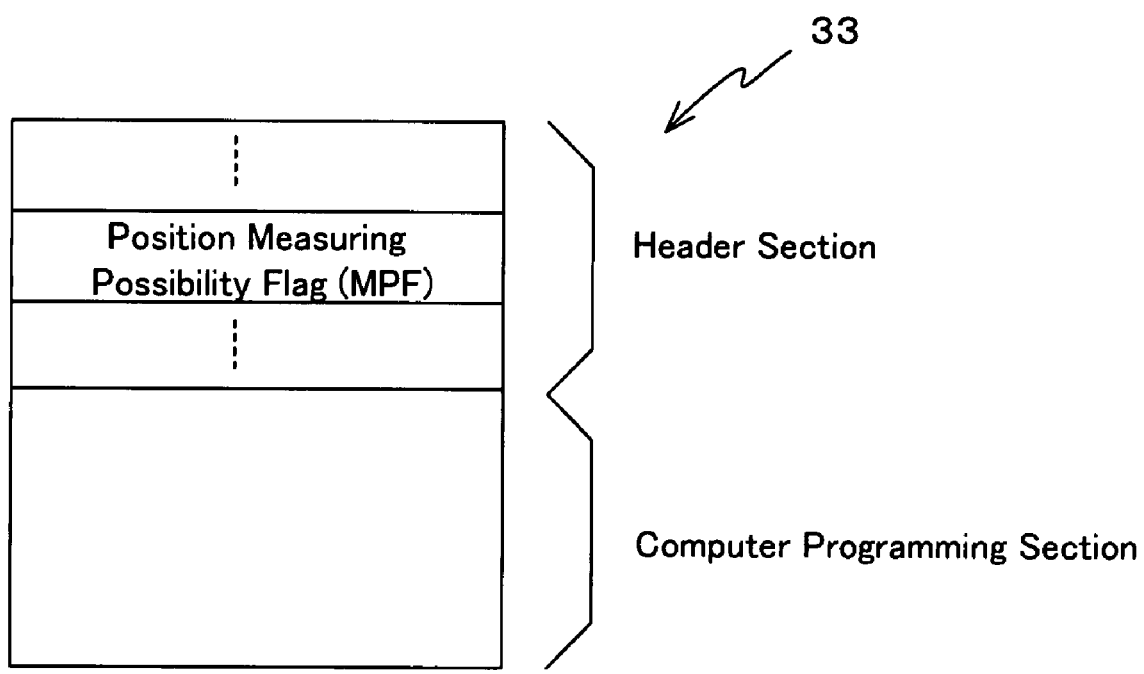
FIG. 5 is a diagram for describing a configuration of an application in FIG. 4.

Moreover, the application 33, as shown in FIG. 5, includes a header section and a computer programming section. A position measuring possibility flag (MPF) is disposed at a predetermined position of the header section. In the first embodiment, an arrangement is made such that the position measuring possibility flag (MPF), during the execution of the application 33, according to the command from the user, is set to be ON when the possibility of performing the GPS position measuring is high, and is set to be OFF when the possibility of performing the GPS position measuring is not high.

The basic processing section 31A and the execution environment section 32 are installed in a cellular phone 10A before being shipped from a factory. Whereas, the application 33 is sometimes installed beforehand prior to being shipped from a factory, and sometimes is installed after being downloaded from the wireless transceiving section 24 by an operation of the operating section 12 by an operator. Moreover, the number of applications in the cellular phone 10A is not restricted to one, and normally the applications are in the cellular phone 10A, but in FIG. 4, only one application 33 is shown schematically.

Associated with the application 33, information such as a request, a response, and an occurrence of an event etc., is exchanged when deemed appropriate, between the basic processing section 31A and the execution environment section 32. Moreover, between the execution environment section 32 and the application 33, various requests from the application 33 are notified to the execution environment section 32, and responses and an occurrence of events are notified from the execution environment section 32.

Coming back to FIG. 3, the control section 21 includes a position measuring section 26 which performs a position measuring of a current location of the cellular phone 10A by using assistance information acquired from the position measuring assistance server 50 via the wireless transceiving section 24. This position measuring section 26 includes an assistance information request transmitting section 27, an assistance information receiving section 28, and an assistance information storage section 29. In this case, the assistance information request transmitting section 27 transmits to the position measuring assistance server 50, an assistance information request which is a request for the assistance information to be used in the GPS position measuring. Moreover, the assistance information receiving section 28 receives the assistance information which is returned from the assistance server, in response to the assistance information request transmitted from the assistance information request transmitting section 27. Furthermore, the assistance information storage section 29 stores the assistance information which is received by the assistance information receiving section 28.

Note that, in the control section 21, when the assistance information is stored in the assistance information storage section 29, a time elapsed after storing the assistance information, and a base station of a cell in a range of which the cellular phone 10A exists, is monitored via the wireless transceiving section 24. Further, after storing the assistance information, with the movement of the cellular phone 10A, when the number of cells in the range of which the cellular phone 10A exists becomes more than one, and the assistance information stored in the assistance information storage section 29 becomes unsuitable to be used for the GPS position measuring of the current location, it becomes necessary to update partially the assistance information in the assistance information storage section 29, and the assistance information cannot be used for the GPS position measuring. Moreover, a validity of the assistance information (more particularly, information of a trajectory of the GPS satellite in the assistance information) is expired after elapsing of a predetermined time (approximately two hours) after storing the assistance information in the assistance information storage section 29, and the assistance information becomes invalid, and cannot be used for the GPS position measuring. Information of whether or not the assistance information in the assistance information storage section 29 can be used for at the time of the GPS position measuring of the current location, is acquired by the basic processing section 31A mentioned above.

Moreover, even when the assistance information which can be used for the GPS position measuring exists in the assistance information storage section 29, when new assistance information which is received upon being returned in response to a new assistance information request, the assistance information in the assistance information storage section 29 is replaced by the new assistance information.

When the position measuring section 26 performs the GPS position measuring upon receiving a command for GPS position measuring from the basic processing section 31A, the position measuring section 26 observes radio waves from the GPS satellite by using the assistance information stored in the assistance information storage section 29. Here, at the time of performing the GPS position measuring, the position measuring section 26 performs the GPS position measuring by capturing four or more GPS satellites.

Note that, when the assistance information which can be used for the GPS position measuring exists in the assistance information storage section 29 when the command for the GPS position measuring is received from the basic processing section 31A, the position measuring section 26 performs the GPS position measuring by using that assistance information. On the other hand, when the assistance information which can be used for the GPS position measuring does not exist in the assistance information storage section 29 when the command for the GPS position measuring is received from the basic processing section 31A, in the position measuring section 26, the assistance information request transmitting section 27 transmits the assistance information request to the position measuring assistance server 50, and the assistance information which is returned from the position measuring assistance server 50 in response to the assistance information request, is received by the assistance information receiving section 28. Further, the assistance information which is received is stored in the assistance information storage section 29. Hereafter, the position measuring section 26 performs the GPS position measuring by using that assistance information.

Figure 6:
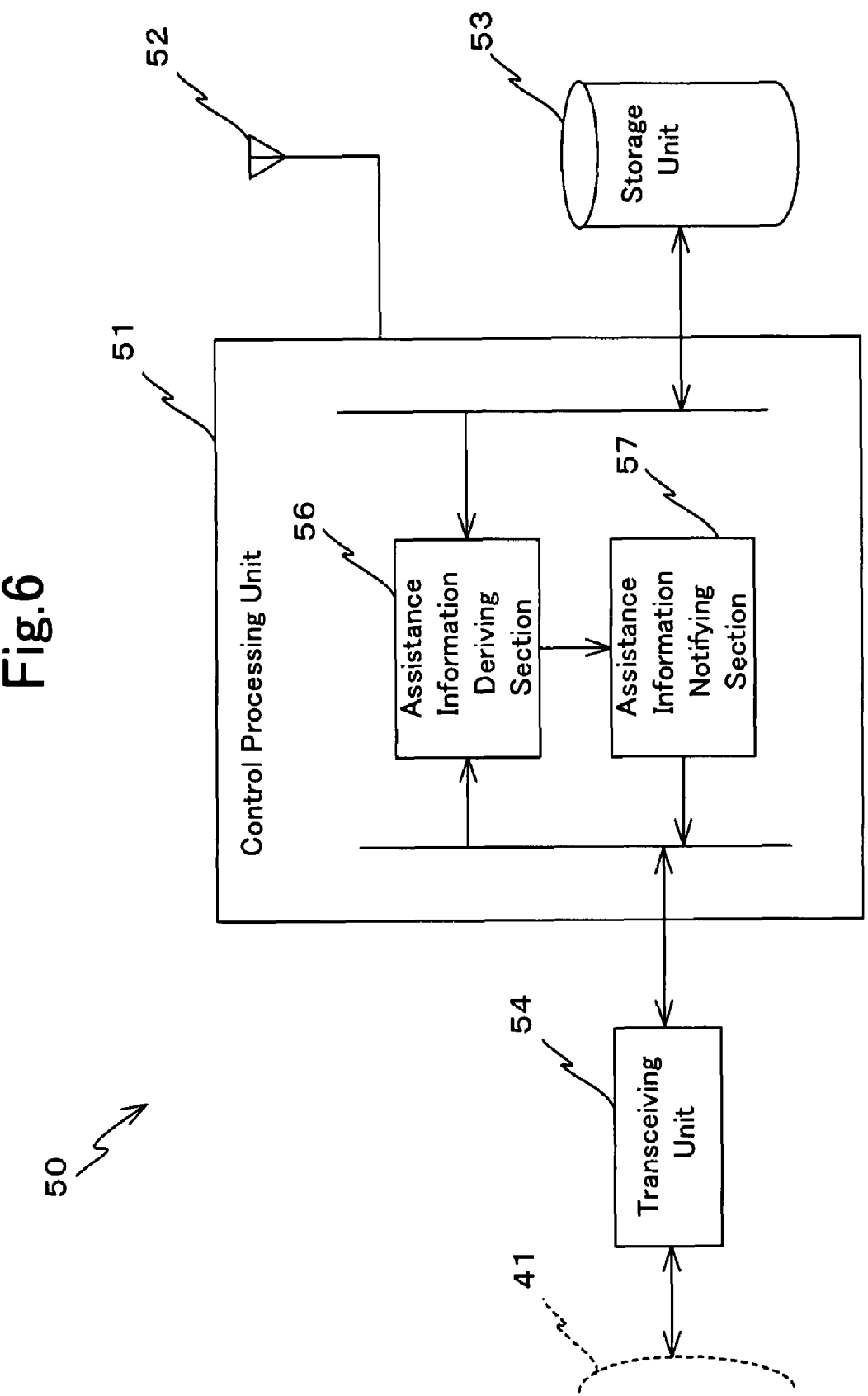
FIG. 6 is a functional block diagram of a position measuring assistance server in FIG. 1.

The position measuring assistance server 50, as shown in FIG. 6, comprises (i) a control processing unit 51 which performs an integrated control of an operation of the entire position measuring assistance server 50, (ii) an antenna 52 for receiving the radio waves from the GPS satellite, (iii) a storage unit 53 for storing various computer programs and data, and (iv) a transceiving unit 54 for performing a communication via the network 41. In this case, the control processing unit 51 comprises (i) an assistance information deriving section 56 which receives the assistance information request via the transceiving unit 54, and derives the assistance information, and (ii) an assistance information notifying section 57 which notifies via the transceiving section 54 and the network 41, the assistance information derived by the assistance information deriving section 56, to a terminal unit which has made the assistance information request.

The assistance information deriving section 56, when receives the assistance information request via the transceiving section 54, reads out from the storage unit 53, base station location information corresponding to a base station identifier which has been specified as a parameter of the assistance information request. Further, the assistance information deriving section 56 derives assistance information called as information for calculating a location and information for capturing, for a monitor unit which has a location calculating function in a cell according to the base station location information which is read out.

The assistance information notifying section 57 receives the assistance information which is derived by the assistance information deriving section 56. Next, the assistance information notifying section 57 notifies the assistance information to the terminal unit which has made the assistance information request.

The position measuring assistance server 50 which is configured in such manner, observes GPS satellites all the time, and constantly gathers various information related to GPS satellites by using the antenna 52. Further, an arrangement is made such that when the assistance information request is received from the terminal unit which is connected to the network 41, the assistance information for the GPS position measuring is notified.

An operation of the position measuring of the current location in the cellular phone 10A which is configured as described above will be described while referring mainly to FIG. 7 and FIG. 8, and while referring to other diagrams where deemed appropriate. Note that it is assumed that the position measuring of the current location is performed according to the command for the GPS position measuring by an operation of the operating section 12 by the user during the execution of the application 33.

Figure 7:
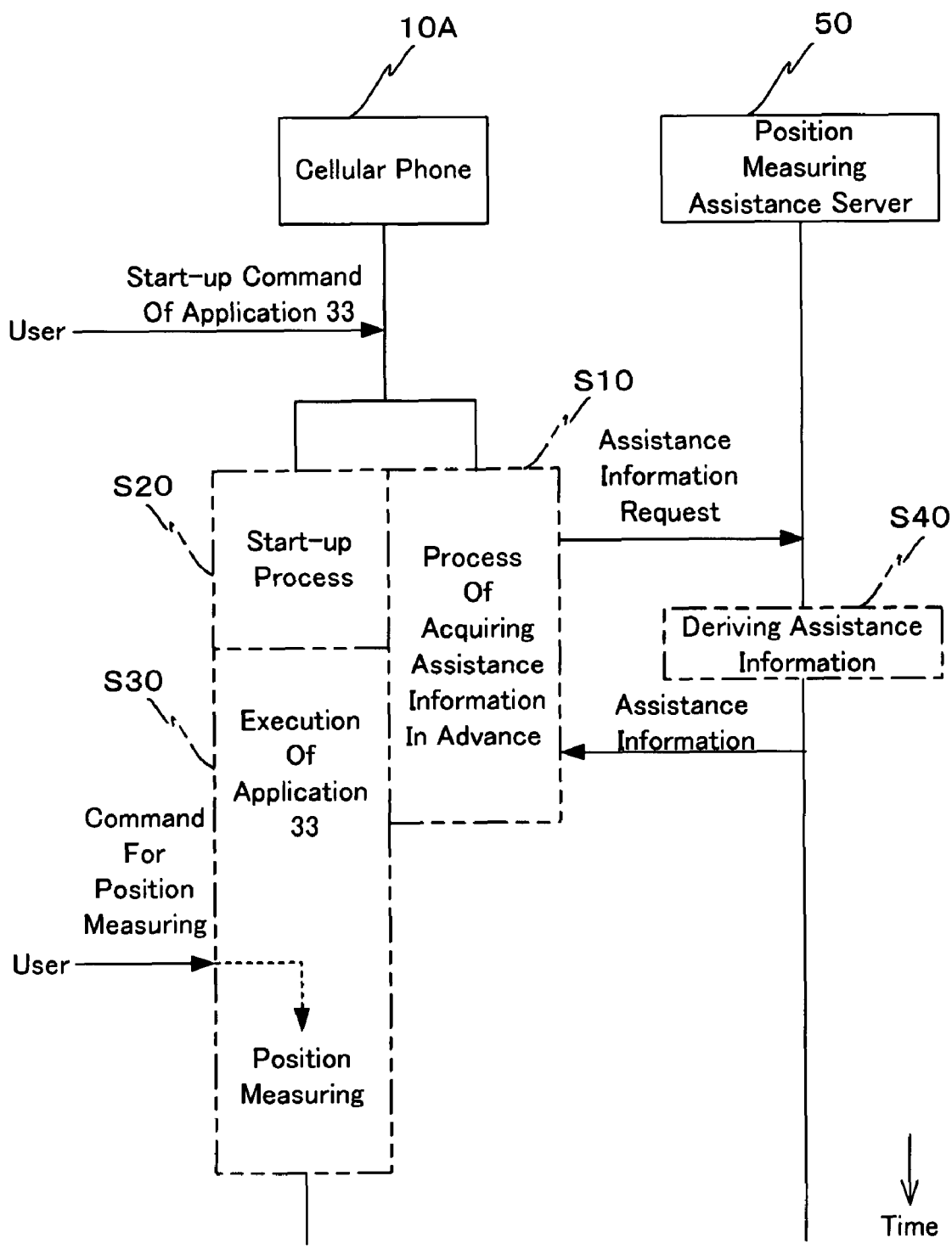
FIG. 7 is a sequence diagram for describing a position measuring operation by the cellular phone in FIG. 2A and FIG. 2B.

As shown in FIG. 7, when a command for a start-up of the application 33 is made by an operation of the operating section 12 by the user, the cellular phone 10A, at step S20, performs a process to start up the application 33. When the start-up process is terminated, at step S30, the application 33 is executed.

Concurrently with the start-up process at the step S20, and sometimes with the execution of the application 33 at the step S30, the cellular phone 10A, at step S10, performs a process of acquiring in advance the assistance information which is used for the GPS position measuring. In this process of acquiring the assistance information in advance, as shown in FIG. 8, first of all, at step S11, the position measuring possibility judging section 36 of the basic processing section 31A reads out the position measuring possibility flag (MPF) in the header section of the above mentioned application 33. Next, at step S12, the position measuring possibility judging section 36, based on the position measuring possibility flag (MPF) which is read out, makes a judgment of whether or not a possibility of performing the position measuring of the current location during the execution of the application 33, is high.

When a judgment result at step S12 is negative, the process is terminated without performing the process of acquiring the assistance information in advance. On the other hand, when the judgment result at step S12 is affirmative, the process is advanced to step S13. At step S13, the position measuring possibility judging section 36 further makes a judgment of whether or not valid information is stored in the assistance information storage section 29.

When a judgment result at step S13 is affirmative, the process is terminated without performing the process of acquiring the assistance information in advance. On the other hand, when the judgment result at step S13 is negative, the process is advanced to step S14.

At step S14, first of all, the basic processing section 31A makes a command for transmitting the assistance information request to the assistance information request transmitting section 27 of the position measuring section 26. The assistance information request transmitting section 27 which has received this command, transmits to the position measuring assistance server 50 the assistance information request in which an identifier of the base station 42 of a cell in the range of which the cellular phone 10A exists, is let to be a parameter, via the wireless transceiving section 24, the base station 42, and the network 41. Hereafter, a stand-by state in which the returning of the assistance information is awaited is assumed.

Coming back to FIG. 7, when the position measuring assistance server 50 receives this assistance information request, at step S40, the position measuring assistance server 50 performs an assistance information deriving process. In this assistance information deriving process, first of all, the assistance information deriving section 56 in the control processing unit 51 in the position measuring assistance server 50, based on the assistance information request received via the transceiving unit 54, reads out location information of the base station 42 which is stored in the storage unit 53 corresponding to the identifier of the base station 42 which is specified as the parameter. Next, the assistance information deriving section 56, based on the location information of the base station 42 which is read out, derives the information for calculating the location, and the information for capturing a satellite which is required for the GPS position measuring by the cellular phone 10A, as the assistance information. Further, the assistance information deriving section 56 transmits the assistance information which is derived to the assistance information notifying section 57. The assistance information notifying section 57 which has received the assistance information transmits the assistance information to the cellular phone 10A via the transceiving unit 54, the network 41, and the base station 42.

Figure 8:
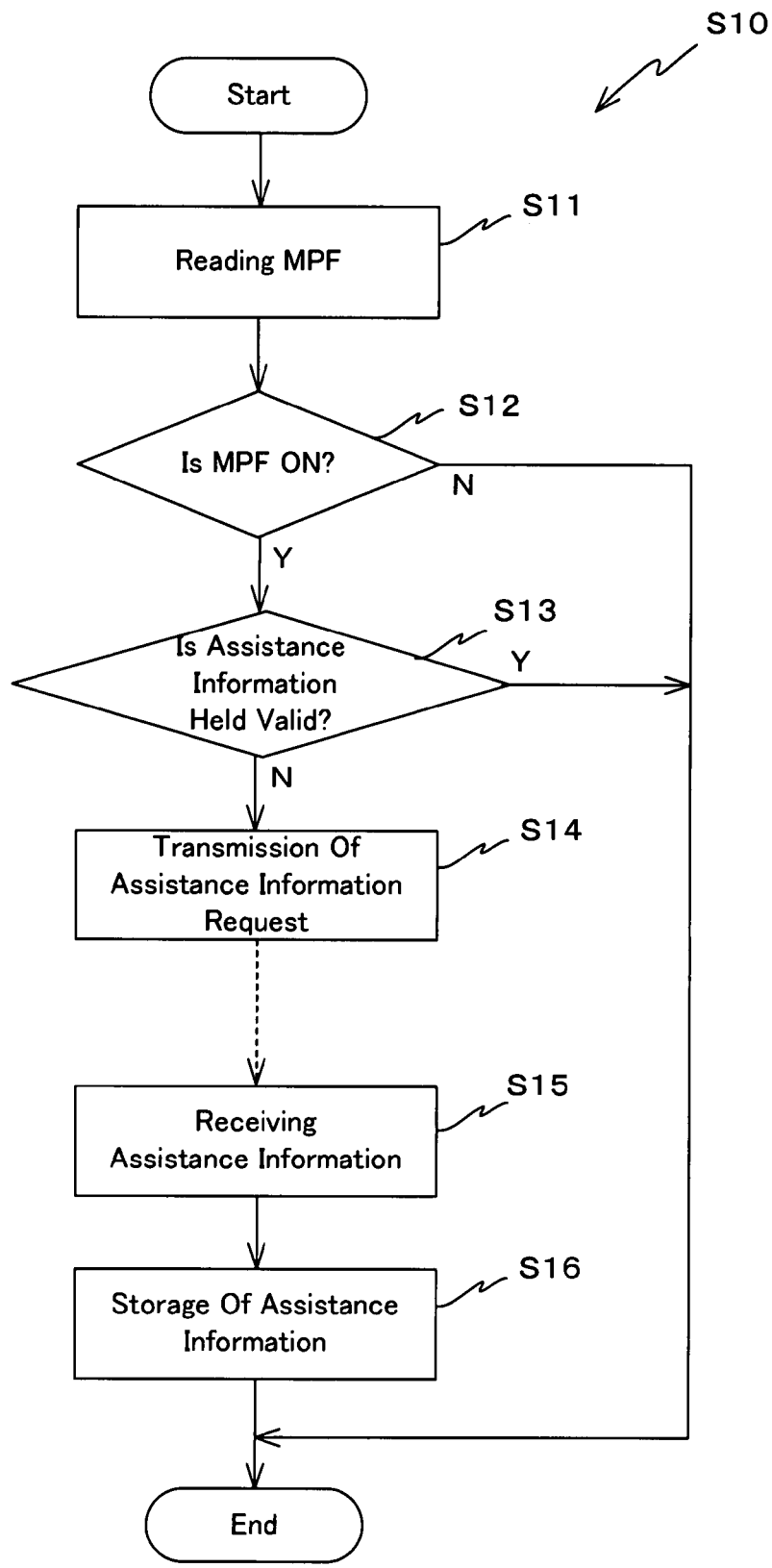
FIG. 8 is a flowchart for describing a process of acquiring assistance information in advance, in FIG. 7.

Coming back to FIG. 8, in the cellular phone 10A, when the assistance information is returned from the position measuring assistance server 50, in the process of acquiring the assistance information in advance of step S10, at step S15, the assistance information receiving section 28 of the position measuring section 26 receives the assistance information. Further, at step S16, the assistance information which is received by the assistance information receiving section 28 is stored in the assistance information storage section 29. Thus, the process of step S10 is terminated.

Note that, in FIG. 7, a process sequence when, in the process of step S10, the assistance information is transmitted from the cellular phone 10A, in other words, when the judgment result at step S12 in FIG. 8 is affirmative, is shown. On the other hand, when the judgment result at the step S12 is negative, in the process of step S10, the assistance information request is not transmitted from the cellular phone 10A. As a result of this, the process of the step S40 in the position measuring assistance server 50, and the transmission of the assistance information from the position measuring assistance server 50 are not performed.

Coming back to FIG. 7, after the assistance information is acquired at step S10, when during the execution of the application 30, the command for the GPS position measuring is made by the operation of the operating section 12 by the user, the position measuring section 26 performs the assisted GPS position measuring. In this assisted GPS position measuring, when the assistance information in the assistance information storage section 29 is usable, the position measuring section 26, by using the assistance information, captures a GPS satellite, and performs a calculation of the current location based on a result of observation of the radio waves from the GPS satellite. Further, position measuring section 26 provides to the user by displaying on the display section 13, a result of the position measuring of the current location which is calculated.

When the assistance information is not acquired at step S10, or when the assistance information is acquired at step S10 but the command is made for the GPS position measuring by the operation of the operation section 12 by the user, during the execution of the application 33 after the assistance information could not be used for the GPS position measuring, the position measuring section 26 acquires newly the assistance information, and performs the GPS position measuring. In this case, the assistance information is acquired newly by the position measuring section 26 by performing a process similar to the process performed at step S14 to step S16 in FIG. 8.

In this case, when the assistance information is acquired at step S10, there are two types of conditions under which the assistance information cannot be used for the GPS position measuring, namely (a) with the movement of the cellular phone 10A, the number of cells in the range of which the cellular phone 10A exists becomes more than one, and the assistance information which is stored in the assistance information storage section 29 becomes unsuitable for using, and (b) the validity period of the assistance information stored in the assistance information storage section 29 is expired and the assistance information is invalidated. As described above, the position measuring section 26 monitors whether or not one of these two types of conditions is satisfied, and reports the observation to the basic processing section 31A.

As it has been described above, in the first embodiment, when the application 33 is started up by an instruction from the user, concurrently with the start-up operation of the application 33, the position measuring possibility judging section 36 makes a judgment of whether or not there is a high possibility of making a request for the GPS position measuring which is performed based on the signal from the GPS satellite, according to the command from the user, during the execution of the application 33. When a result of this judgment is affirmative, the position measuring possibility judging section 36 further makes a judgment of whether or not there exists valid information in the assistance information storage section 29. Further, when a result of this judgment is negative, the assistance information request transmitting section 27 transmits to the position measuring assistance server 50, the assistance information request which is a request for the assistance information to be used for the GPS position measuring.

When the assistance information is returned from the position measuring assistance server 50 in response to the assistance information request, in the cellular phone 10A, the assistance information receiving section 28 receives the assistance information, and stores the assistance information in the assistance information storage section 29. Thus, after storing the assistance information in the assistance information storage section 29, the cellular phone 10A is prepared for the assisted GPS position measuring by the user during the execution of the application 33 for which the possibility of being performed during a short period after the start-up of the application 33 is high.

Consequently, according to the first embodiment, at the time of position measuring of the current location of the mobile communication terminal, it is possible to perform the position measuring with an improved convenience for the user while suppressing rationalistically the communication charges.

Moreover, in the first embodiment, the position measuring possibility judging section 36, based on a value of the position measuring possibility information flag (MPF) of the application 33, makes a judgment of whether or not the possibility of the application 33 making a request for the GPS position measuring is high. Therefore, an application programmer can specify the possibility of the application 33 performing the position measuring operation, as a value of the position measuring possibility flag (MPF), according to a content of the application 33. Therefore, it is possible to make a judgment of whether or not a possibility of making a request for the GPS position measuring accurately is high.

Note that, in the first embodiment, as position measuring possibility information, a position measuring possibility flag (MPF) bearing binary information namely ON and OFF is used. Whereas, it is also possible to let the position measuring possibility information to be multivalued information, and to make a judgment of whether or not the possibility of the application 33 making the request for the GPS position measuring is high, by judging a magnitude in comparison with (with respect to) a threshold value which is set by the user.

Moreover, in the first embodiment, at the time of start-up of the application, based on the position measuring possibility flag (MPF) is let to be made, when the possibility of performing the position measuring of the current location during the execution of the application 33 is judged to be high, a judgment of whether or not the valid assistance information is stored in the assistance information storage section 29 is let to be made. Whereas, at the time of start-up of the application, when only a judgment based on the position measuring possibility flag (MPF), and the possibility of performing the position measuring of the current location during the execution of the application 33 is judged to be high, it is possible to make an arrangement such that the new assistance information is acquired, irrespective of whether or not the valid assistance information is stored in the assistance information storage section 29. In this case, when there is no substantial movement of the cellular phone 10A, it is possible to ensure a validity period of the assistance information from the start-up of the application 33. Therefore, when there is no substantial movement of the cellular phone 10A, it is possible to prevent an occurrence of a situation in which it is necessary to start from acquiring the new assistance information at the time of performing the position measuring during a short period from the start up of the application.

Moreover, although in the first embodiment, the present invention is applied to the position measuring of the current location of a cellular phone, it is needless to mention that the present invention is applicable to a mobile communication terminal other than the cellular phone.

Second Embodiment

Next, a second embodiment of the present invention will be described below. Note that, in the following description, same reference numerals are assigned to components which are similar or same as in the first embodiment, and the repeated description is omitted.

A cellular phone 10B of the second embodiment, as shown in FIG. 9A, FIG. 9B and FIG. 10, is formed similarly as the cellular phone 10A in the first embodiment. As shown in FIG. 11, the second embodiment differs from the first embodiment at a point that instead of the basic processing section 31A in the first embodiment, a basic processing section 31B is executed in the control section 21. This basic processing section 31B includes an assistance information holding period setting section 37 and an assistance information acquiring condition judging section 38.

The assistance information holding period setting section 37 sets an assistance information holding period which is a period during which the assistance information to be used for the GPS position measuring of the current location of the cellular phone 10B has to be held continuously irrespective of whether or not the command for the GPS position measuring is made by the user. Moreover, the assistance information acquiring condition judging section 38 makes a judgment of whether or not conditions, under which the assistance information is to be acquired newly, are satisfied. In this case, the assistance information acquiring condition judging section 38 finds out whether or not the assistance information which can be used for the GPS position measuring of the current location is stored in the assistance information storage section 29 of the position measuring section 26, and when the usable assistance information is stored in the assistance information storage section 29, the assistance information acquiring condition judging section 38 makes a judgment that the condition under which the assistance information is to be acquired newly is not satisfied. On the other hand, when the usable information is not stored in the assistance information storage section 29, the assistance information acquiring condition judging section 38 makes a judgment that the condition under which the assistance information is to be acquired newly is satisfied.

An operation of the position measuring of the current location in the cellular phone 10B which is formed as mentioned above will be described while referring mainly to FIG. 12 and FIG. 13, and while referring to other diagrams where deemed appropriate. Note that, it is assumed that the position measuring of the current location is performed according to the command for the GPS position measuring by an operation of the operating section 12 by the user during the execution of the application 33. Moreover, the operation of the position measuring of the current location is let to be performed in a state in which the cellular phone 10B is disposed instead of the cellular phone 10A, in the position measuring system 100 in FIG. 1 described above.

Figure 12:
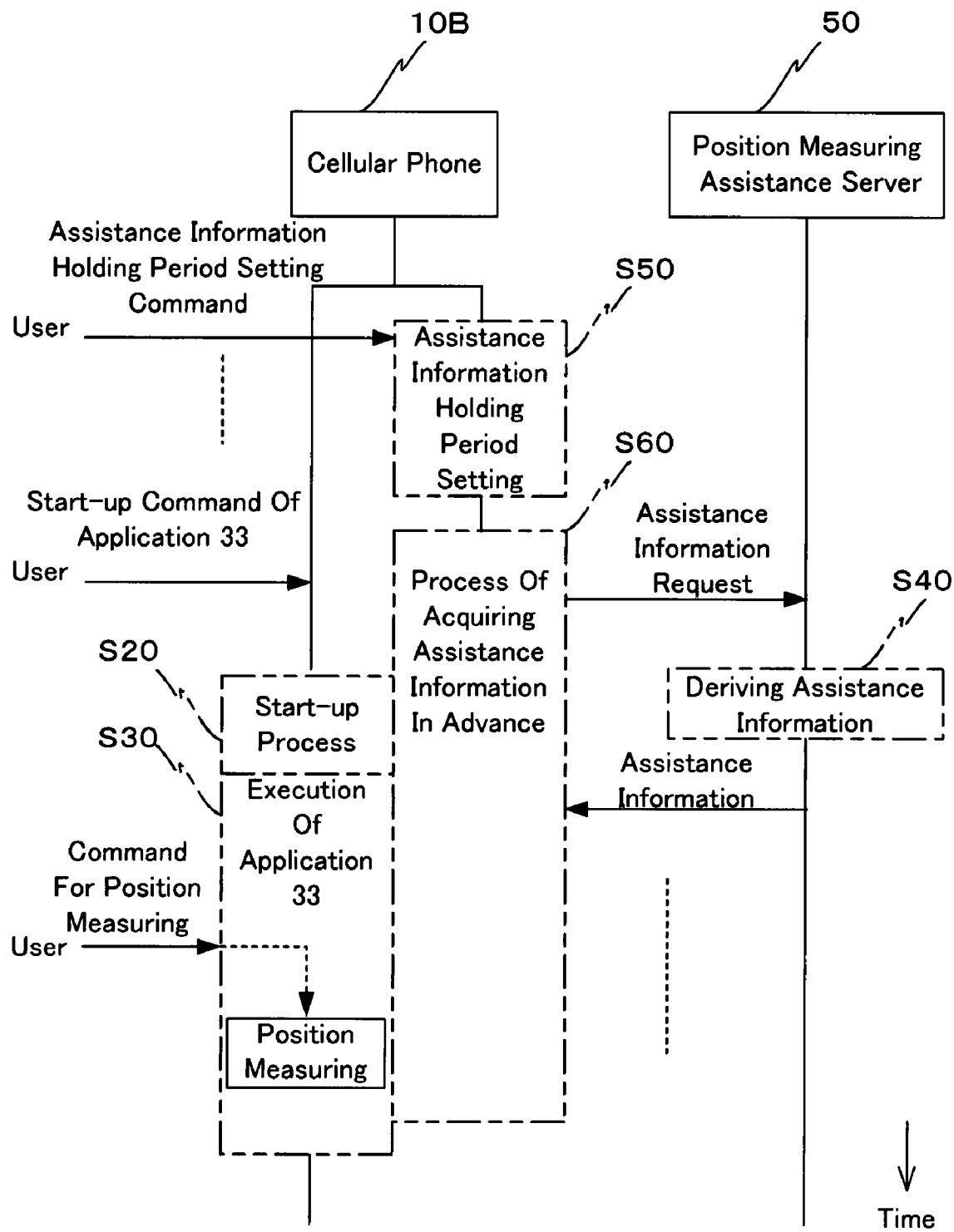
FIG. 12 is a sequence diagram for describing a position measuring operation by the cellular phone in FIG. 9A and FIG. 9B.

As shown in FIG. 12, as a process associated with the GPS position measuring, first of all, a process of setting the assistance information holding period is performed at step S50. This process is started by inputting a command for starting the setting of the assistance information holding period by an operation of the operating section 12 by the user. When this command is received, the assistance information holding period setting section 37 of the basic processing section 31B displays a screen for setting the assistance information holding period on the display section 13, and urges the user to set the assistance information holding period. An example of such a screen for setting the assistance information holding period is shown as a screen F13A in FIG. 13. Note that, in the example of the screen F13A, a starting time of the assistance information holding period and a length of the assistance information holding period are to be specified by the user.

The user, while referring to the screen for setting the assistance information holding period which is displayed on the display section 13, performs an operation of the operating section 12 and performs an input to specify the period for setting the assistance information holding period. Thus, an example of a display on the display section 13 when the input to specify the period is performed is shown in a screen F13B in FIG. 13. In the example of the screen F13B, an example in which, as a starting time of the period of the assistance information holding period "current point of time" is specified, and as a length of the assistance information holding period "two hours" is specified.

When the input to specify the period is performed, the assistance information holding period setting section 37 stores the specified period as the assistance information holding period, in an assistance information holding period storage section which is not shown in the diagram. Thus, the process of setting the assistance information holding period at step S50 is terminated.

When the process of setting the assistance information holding period is terminated, the basic processing section 31B starts monitoring whether or not the assistance information holding period is started. Further, when the assistance information holding period is detected to be started, till the period is over, the process of acquiring the assistance information in advance is performed at step S60. Note that, as in the example of the screen F13B described above, when "current point of time" is specified as the starting time of the assistance information holding period, the process at step S60 is started immediately after the termination of step S50.

Figure 14:
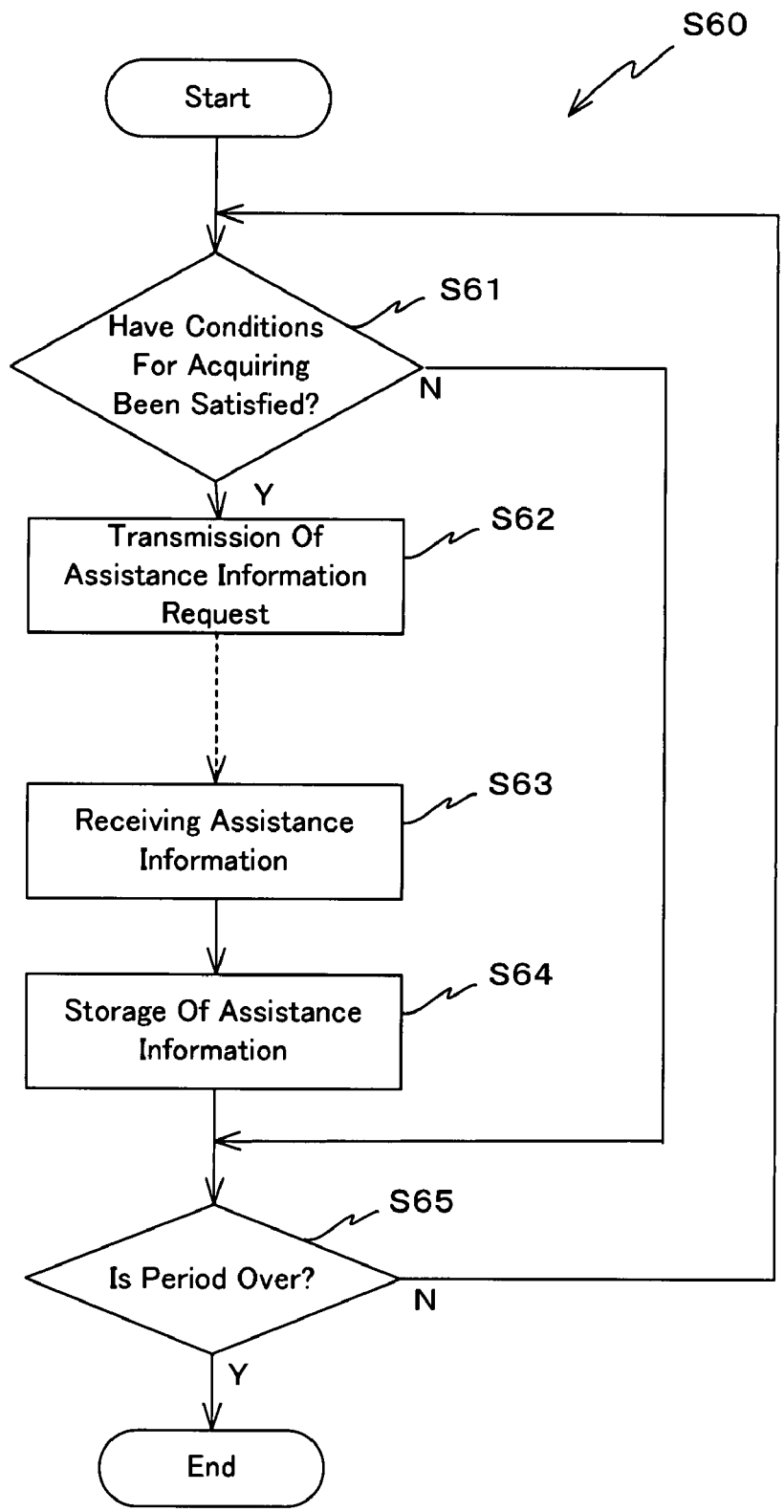
FIG. 14 is a flowchart for describing a process of acquiring assistance information in advance in FIG. 12.

In this process of acquiring the assistance information in advance at step S60, as shown in FIG. 14, first of all, at step S61, the assistance information acquiring condition judging section 38 of the basic processing section 31B makes a judgment of whether or not the condition under which the assistance information is to be acquired newly, is satisfied. In this case, the judgment of whether or not the condition under which the assistance information is to be acquired newly is satisfied, as described above, is made by the assistance information acquiring condition judging section 38 based on information of whether or not the assistance information which can be used for the GPS position measuring of the current location is stored in the assistance information storage section 29 of the position measuring section 26, which is read out by the assistance information acquiring condition judging section 38. When this judgment result is negative, the process is advanced to step S65.

On the other hand, when the judgment result at step S61 is affirmative, steps S62 to S64 which is a process similar to steps S14 to S16 in FIG. 8 of the first embodiment is executed, and the new assistance information is acquired from the position measuring assistance server 50, and stored in the assistance information storage section 29. Note that At the time of acquiring the assistance information by the cellular phone 10B, the position measuring assistance server 50 also executes the process at step S40 similarly as in the first embodiment (refer to FIG. 12).

Thus, when a process at step S64 is terminated, the process is advanced to step S65 similarly as in a case when the negative judgment is made at step S61 described above. At step S65, the assistance information acquiring condition judging section 38 makes a judgment of whether or not the assistance information holding period is over. When a result of this judgment is affirmative, the process at step S60 is terminated. On the other hand, when the judgment result at step S65 is negative, the process is moved to step S61. Further, the process at step S61 to step S65 described above is repeated.

Similarly as in the first embodiment described above, once the assistance information is acquired, there are two types of conditions under which the assistance information cannot be used for the GPS measuring, namely (a) with the movement of the cellular phone 10B, the number of cells in the range of which the cellular phone 10B exists becomes more than one, and the assistance information which is stored in the assistance information storage section 29 becomes unsuitable for using, and (b) the validity of the assistance information which is stored in the assistance information storage section 29 is expired and the assistance information becomes invalid. As mentioned above, the position measuring section 26 monitors whether or not one of these two types of conditions is satisfied, and reports the observation to the basic processing section 31B appropriately.

Moreover, during the assistance information holding period, when the valid assistance information does not exist in the assistance information holding period storage section, and when an operation for acquiring the assistance information is not performed, for example, as shown as a screen F15A in FIG. 15, a gray-out display of a quick position measuring mode mark QPM is performed. Note that, in the screen F15A, a dashed line display of the quick position measuring mode mark QPM shows that it is a gray-out display.

Furthermore, during the assistance information holding period, when the operation of acquiring the new assistance information is being performed, for example, a light-up display of the quick position measuring mode mark QPM which is shown as a screen F15B in FIG. 15, and a light-out display of the quick position measuring mode mark QPM which is shown as a screen F15C in FIG. 15 are performed alternately. Further, when the new assistance information is acquired, and the valid information exists in the assistance information holding period storage section, the light-up display of the quick position measuring mode mark QPM is performed continuously.

Note that when the assistance information holding period is elapsed, the light-out display of the quick position measuring mode mark QPM is performed.

Coming back to FIG. 12, during the process of acquiring the assistance information in advance at step S50 which is performed as mentioned above, when a command for the start up of the application 33 is made by the operation of the operating section 12 by the user, the cellular phone 10B, at step S20, performs a start-up process of the application 33. When the start-up process is terminated, at step S30, the application 33 is executed.

Further, during the execution of the application 33, when the command for the GPS position measuring is made by the operation of the operating section 12 by the user, position measuring section 26 performs the assisted GPS position measuring. When this assisted GPS position measuring is performed during the assistance information holding period, since the assistance information in the assistance information storage section 29 is usable, the position measuring section 26, by using the assistance information, captures a GPS satellite, and performs a calculation of the current location based on a result of observation of the radio waves from the GPS satellite. Further, the position measuring section 26 provides to the user by displaying on the display section 13, a result of the position measuring of the current location which is calculated.

When the assisted GPS position measuring by the position measuring section 26 which is according to the command for GPS position measuring by the operation of the operating section 12 by the user is performed at a time other than during the assistance information holding period, the assistance information which is usable does not exist in the assistance information storage section 29 except immediately after the assistance information holding period is over. Therefore, when a command for the GPS position measuring by the operation of the operating section 12 by the user is made at a time other than the assistance information holding period except immediately after the end of the assistance information holding period, the position measuring section 26 newly acquires the assistance information, and performs the GPS position measuring. In this case, the new acquiring of the assistance information by the position measuring section 26 is performed by performing a process similar to the process at steps S62 to S64 in FIG. 14 described above, by the position measuring section 26.

As it has been described above, in the second embodiment, the assistance information holding period setting section 38, according to the command from the user, sets the assistance information holding period which is a period during which the assistance information which is used for the GPS position measuring of the current location, is to be held continuously. Hereafter, the assistance information acquiring condition judging section 38 makes a judgment of whether or not the conditions, under which the assistance information is to be acquired newly, are satisfied. When the result of this judgment is affirmative, the assistance information request transmitting section 27 transmits to the position measuring assistance server 50, the assistance information request which is a request for the assistance information to be used for the GPS position measuring.

When the assistance information is returned from the assistance information assistance server 50 in response to the assistance information request, in the cellular phone 10B, the assistance information receiving section 28 receives the assistance information, and stores in the assistance information storage section 29. Thus, the assistance information is stored in the assistance information storage section 29, and is prepared for a command for the assisted GPS position measuring, from the user during the execution of the application 33.

Consequently, according to the second embodiment, it is possible to perform the position measuring with the improved convenience for the user, while suppressing rationalistically the communication charges.

Moreover, in the second embodiment, since the conditions under which the assistance information is to be acquired newly are let to include that the number of cells in which the cellular phone 10B exists becomes more than one after previous assistance information is acquired, when the assistance information which is acquired before is required to be updated as a result of the movement of the cellular phone 10B, the new assistance information is acquired.

Furthermore, in the second embodiment, the conditions under which the assistance information to be acquired newly are let to further include that the validity of the assistance information which is acquired previous time has expired. Therefore, with the elapsing of time, when the validity of the assistance information acquired the previous time is expired, and the assistance information becomes invalid, the new assistance information is acquired.

In the second embodiment, at the time of setting the assistance information holding period, the setting of the starting time and the length of the assistance information holding period is let to be specified by the user. However, it is also possible to let the user to set the starting time and the ending time, at the time of setting the assistance information holding period.

Moreover, in the second embodiment, the present invention is applied to the position measuring of the current location of a cellular phone. However, it is needless to mention that the present invention is applicable to a mobile communication terminal other than the cellular phone, similarly as in the case of the first embodiment described above.

Furthermore, in the first embodiment described above, although a display which shows that the operation of acquiring the new assistance information is being performed was not made particularly, it is possible to make an arrangement such that a blinking display of the quick position measuring mark QPM is made.

As it has been described above, a method for position measuring of the present invention can be applied to a position measuring of a current location of a mobile communication terminal. Moreover, a mobile communication terminal of the present invention can be applied to a mobile communication terminal which is capable of performing the position measuring of the current location.

What is claimed is:

1. A method for position measuring in which a position measuring of a current location of a mobile communication terminal is performed, comprising steps of:
    a judging step at which, the mobile communication terminal, prior to a command for position measuring made by a user, makes a judgment of whether or not assistance information which is to be used for a GPS position measuring which is performed based on a signal from a GPS satellite, is to be acquired;
    a transmitting step of transmitting an assistance information request at which, when a judgment result at the judging step is affirmative, the mobile communication terminal transmits the assistance information request which is a request for the assistance information, to an assistance server; and
    a receiving step of receiving the assistance information at which, the mobile communication terminal receives the assistance information which is returned from the assistance server in response to the assistance information request.

2. The method for position measuring according to claim 1, wherein
    at the judging step, at a start-up time of an application in the mobile communication terminal, an affirmative judgment is made when it is estimated that a possibility of the GPS position measuring being performed during an execution of the application is high.

3. The method for position measuring according to claim 2, wherein
    at the judging step, it is estimated whether or not the possibility of the GPS position measuring being performed during the execution of the application is high, based on a predetermined parameter of the application.

4. The method for position measuring according to claim 1, further comprising a step of:
    setting a period at which, an assistance information holding period which is a period during which the mobile communication terminal has to hold continuously the assistance information, irrespective of whether or not the command for the position measuring is made by the user, is set wherein
    at the judging step, during the assistance information holding period, an affirmative judgment is made when conditions under which the assistance information is to be acquired newly, are satisfied.

5. The method for position measuring according to claim 4, wherein
    the assistance information holding period is a period from a point of time at which the assistance information holding period is set at the step of setting the period, till a specified time is elapsed, at the step of setting the period.

6. The method for position measuring according to claim 4, wherein
    the assistance information holding period is a period from a starting time which is set at the step of setting the period, till an ending time.

7. The method for position measuring according to claim 4, wherein
    the conditions under which the assistance information is to be acquired include that the number of cells in which the mobile communication terminal existed has become more than one, after acquiring the assistance information previous time.

8. The method for position measuring according to claim 4, wherein
    the conditions under which the assistance information is to be acquired include that a validity of the assistance information which was acquired previous time has expired.

9. A mobile communication terminal which performs a position measuring of a current location, comprising:
    a means for judging which, prior to a command for position measuring made by a user, makes a judgment of whether or not the assistance information which is to be used for a GPS position measuring which is performed based on a signal from a GPS satellite is to be acquired;
    an assistance information request transmitting means which transmits an assistance information request which is a request for the assistance information which, when a result of the judgment is affirmative, transmits the assistance information request to an assistance server;
    an assistance information receiving means which receives the assistance information which is returned from the assistance server in response to the assistance information request; and
    an assistance information storage means which stores the assistance information which is received by the assistance information receiving means.

10. The mobile communication terminal according to claim 9, wherein
    the means for judging, at a start-up time of an application, makes an affirmative judgment when it is estimated that a possibility of the GPS position measuring being performed during an execution of the application is high.

11. The mobile communication terminal according to claim 9 further comprising:
    a period setting means which sets an assistance information holding period which is a period during which the mobile communication terminal has to hold continuously the assistance information, irrespective of whether or not the command for the position measuring is made by the user, wherein
    the means for judging, during the assistance information holding period, makes an affirmative judgment when a condition under which the assistance information is to be acquired newly, is satisfied.

* * * * *